United States Patent [19]

Nowacki

[11] Patent Number: 4,969,663
[45] Date of Patent: Nov. 13, 1990

[54] APPARATUS FOR PROMOTING USE OF SEAT BELTS

[76] Inventor: Joseph Nowacki, 512 N. Paulina, Chicago, Ill. 60622

[21] Appl. No.: 325,979

[22] Filed: Mar. 20, 1989

[51] Int. Cl.⁵ ............................................. B60R 22/28
[52] U.S. Cl. ................................... 280/808; 280/801; 297/482
[58] Field of Search ............... 280/801, 804, 808, 806; 297/482, 483, 488

[56] References Cited

U.S. PATENT DOCUMENTS

| 4,619,468 | 10/1986 | Spill | 280/801 |
| 4,678,205 | 7/1987 | Wold | 280/808 |
| 4,741,574 | 5/1988 | Weightman et al. | 280/801 |

FOREIGN PATENT DOCUMENTS 3501747  9/1986  Fed. Rep. of Germany ...... 297/482

Primary Examiner—Richard A. Bertsch
Attorney, Agent, or Firm—Wallenstein, Wagner & Hattis, Ltd.

[57] ABSTRACT

A decorative seat belt cover adapted for removably covering an exposed surface of a seat belt to promote use of the seat belt is disclosed.

9 Claims, 2 Drawing Sheets

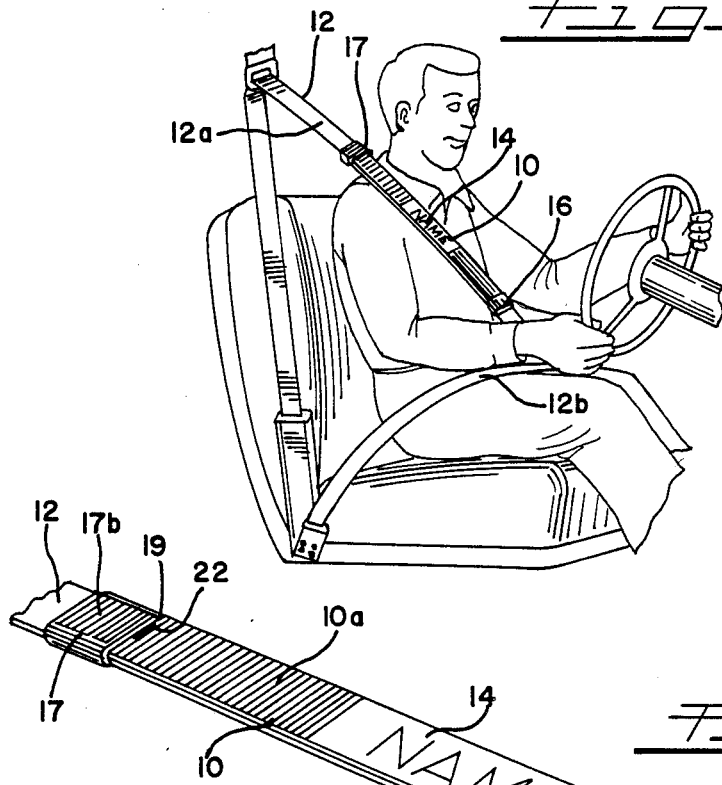
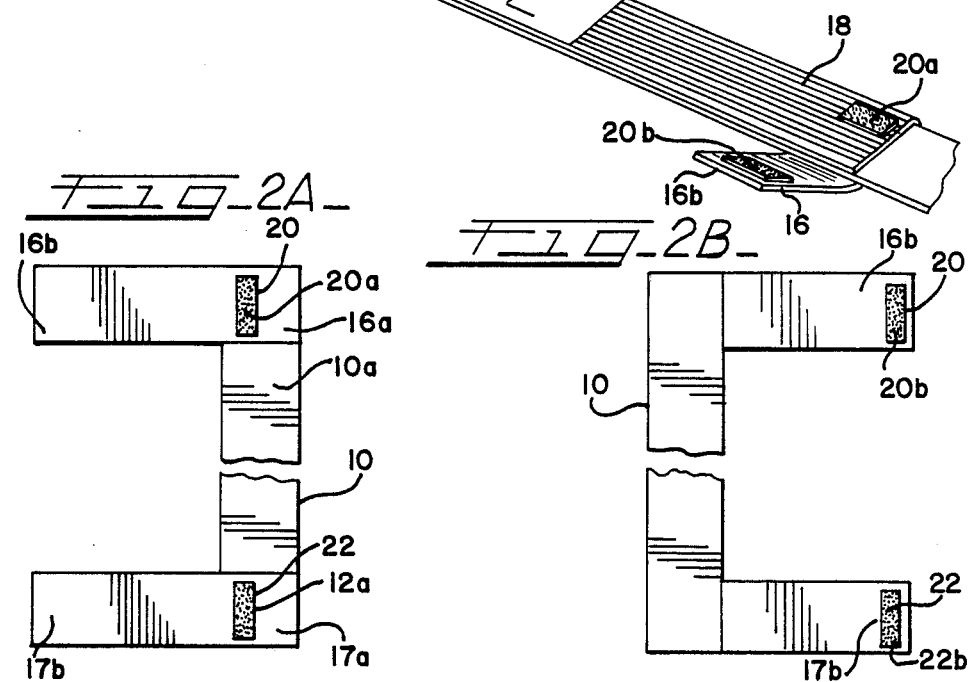

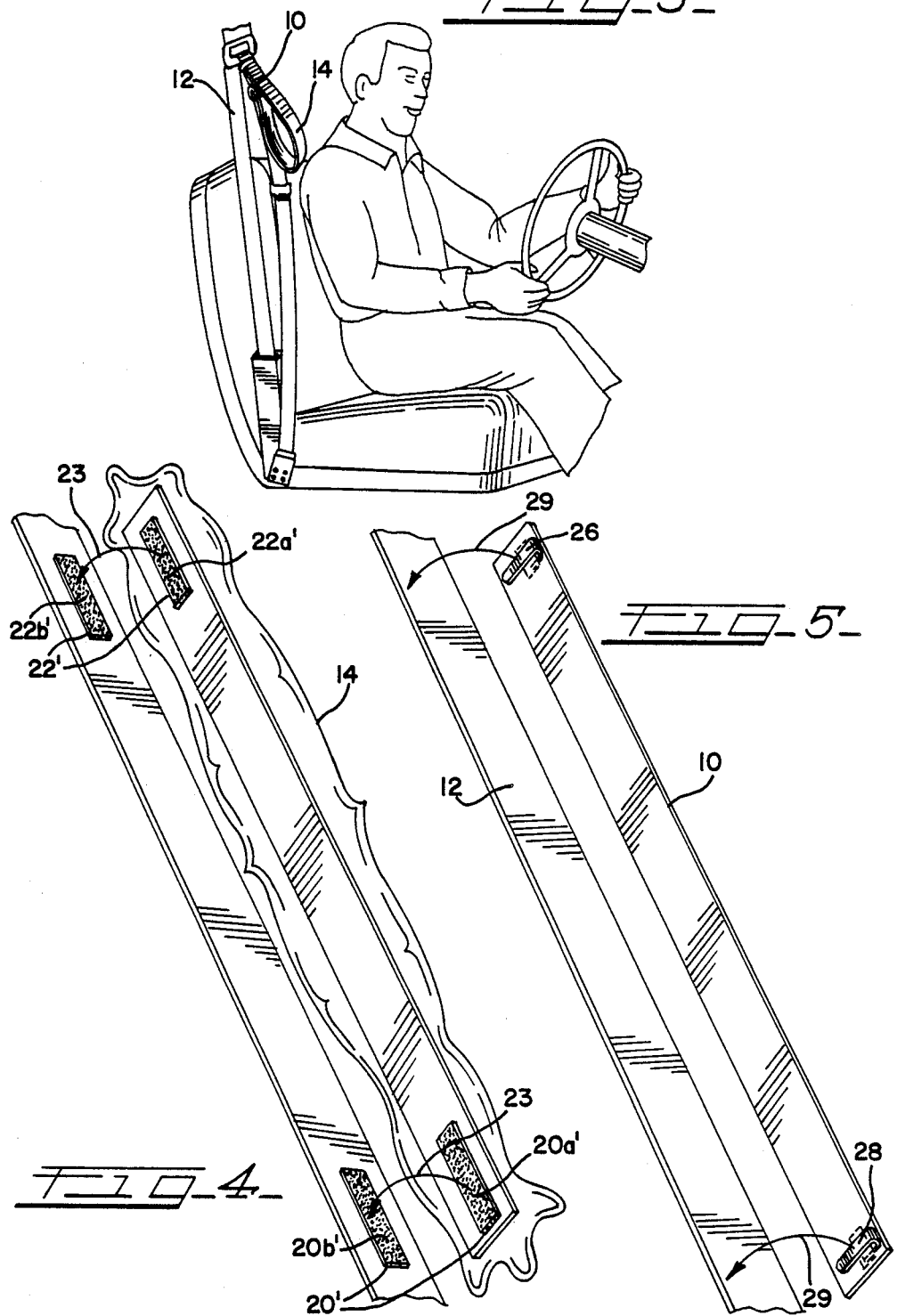

ated in FIGS. 2, 2A, and 2B. The seat belt cover 10 has an outward facing surface 10a on which the indicia 14 is printed, or otherwise affixed.

APPARATUS FOR PROMOTING USE OF SEAT BELTS

DESCRIPTION

1. Technical Field

My invention relates to an apparatus for promoting use of seat belts, such as in an automobile, and more particularly, to a cover for a seat belt.

2. Background Prior Art

Personal injury of passengers in a vehicle as a result of a vehicular accident, such as an automobile accident, is an extremely serious problem in today's society. Although many attempts have been made to reduce the number of automobile accidents, such attempts have not been significantly successful. To date, the most effective solution to this problem is the use of the simple seat belt. However, in order for a seat belt to effectively protect a passenger from injury, the seat belt must be worn by the passenger. It is of absolutely no benefit unused in its retracted position.

To promote the use of seat belts, many states have passed laws requiring their use. While these have been somewhat effective in encouraging use of seat belts, passengers still fail to use their seat belts, especially on short trips, which statistics show to be the most likely trips in which to have an accident. Unless a passenger desires to wear a seat belt, the passenger likely will not wear a seat belt. What is needed is a device which will cause the passenger to desire to wear a seat belt.

My invention is provided to solve this and other problems.

SUMMARY OF THE INVENTION

It is an object of the invention to provide a seat belt cover which will appeal to a wearer and promote use of seat belts. The seat belt cover is easily removable and can be attached to either the shoulder or lap portion of the seat belt.

The seat belt cover is adapted for covering an exposed portion of the surface of the seat belt. The seat belt cover may include a decorative pattern or indicia, as the wearer may desire.

According to my invention, the seat belt cover is made of a fire resistant material and comprises an elongated strap having a first and a second strap end. The seat belt cover further includes means for attaching the strap to the seat belt such that the strap covers an exposed portion of the surface of the seat belt cover.

In accordance with a first embodiment of my invention, the seat belt cover includes means for slidably attaching the strap to the seat belt, thereby preventing the seat belt cover from interfering with retraction of the seat belt.

It is comprehended that the attachment means of this first embodiment of my seat belt cover comprises a first tab having a first tab secured end attached to the first end of the strap and a first tab free end extending from the first strap end. The first tab is of sufficient length to permit the first tab free end to wrap around the seat belt.

The attachment means further includes a second tab having a second tab secured end attached to the second strap end and a second tab free end extending from the second strap end. Similarly, the second tab is of sufficient length to permit the second tab free end to wrap around the seat belt.

A first loop and hook latch is disposed on the first tab for securing the first tab free end to the first tab secured end when the first tab is wrapped around the seat belt. A second loop and hook latch is disposed on the second tab for securing the second tab free end to the second tab secured end when the second tab is wrapped around the seat belt.

In accordance with a second embodiment of my invention, the attachment means comprises a two piece latch device. The first piece of the two piece latch device is attached to the exposed surface of the seat belt and the second piece of the two piece latch device is attached to the seat belt cover.

In accordance with a third embodiment of my invention, the attachment means comprises first and second clips. The first clip is attached to the strap first end and the second clip is attached to the strap second end.

Other features and advantages of my invention will be apparent from the following specification taken in conjunction with the following drawings.

BRIEF DESCRIPTION OF DRAWINGS

FIG. 1 is a view of a seat belt cover according to my invention attached to a seat belt while the seat belt is in use by a passenger;

FIG. 2 is a perspective view of a first embodiment of the seat belt cover;

FIGS. 2A and 2B are partial plan views of the seat belt cover of FIG. 2;

FIG. 3 is a view of the seat belt cover shown in FIG. 1 attached to a seat belt while the seat belt is in its retracted position;

FIG. 4 is a perspective view of a second embodiment of the seat belt cover; and

FIG. 5 is a perspective view of a third embodiment of the seat belt cover.

DETAILED DESCRIPTION

While my invention is susceptible of embodiments in many different forms, there is shown in the drawings and will herein be described in detail, preferred embodiments of my invention with the understanding that the present disclosure is to be considered as an exemplification of the principles of my invention and is not intended to limit the broad aspects of my invention to the embodiments illustrated.

A seat belt cover 10 according to my invention is illustrated in FIG. 1 attached to a seat belt 12. While the seat belt cover 10 is shown attached to a shoulder portion 12a of the seat belt 12, it should be understood that the seat belt cover 10 could be attached to a lap portion 12b of the seat belt 12 without departing from the scope of my invention. For added safety, the seat belt cover 10 can be made of a fire resistant material.

The seat belt cover 10 may include a decorative indicia 14, such as the wearer's personal name, favorite professional sport team logo or cartoon character, or the like. Because of the unique use of such indicia 14, and the affection of the general public to exhibit such indicia 14, there is a greater likelihood that passengers would wear the seat belt 12.

Three particular embodiments of my invention are discussed in greater detail below, though common reference numerals have been utilized for clarity.

A first embodiment of the seat belt cover 10 is illustrated in FIGS. 2, 2A, and 2B. The seat belt cover 10 has an outward facing surface 10a on which the indicia 14 is printed, or otherwise affixed.

The seat belt cover 10 is slidably attached to the seat belt 12 by first and second tabs 16, 17 having respective first and second secured ends 16a, 17a, and first and second free ends 16b, 17b. The first and second tabs are of sufficient length to permit the respective first and second free ends 16b, 17b to wrap around the seat belt 12. The first and second tab free ends 16b, 17b are then attached to their respective first and second secured ends 16a, 17a by respective first and second hook and loop latches 20, 22, such as Velcro ® fasteners. While hook and loop latches are preferred, other fasteners such as snaps could be used instead without departing from the scope of my invention.

A more detailed illustration of the first and second tabs 16, 17, and the respective first and second hook and loop latches 20, 22 are illustrated in FIGS. 2A and 2B.

Each of the first and second hook and loop latches 20, 22 include respective first and second hook pieces 20a, 22a and first and second loop pieces 20b, 22b. The hook pieces 20a, 22a are adhered to their respective tab secured ends 16a, 17a, and the loop pieces 20b, 22b are adhered to their respective tab free ends 16b, 17b, though this order could be reversed. Thus when the first and second tab free ends 16b, 17b are wrapped around the seat belt 12, the first hook piece 20a mates with the first loop piece 20b, and the second hook piece 22a mates with the second loop piece 22b.

A second embodiment of my seat belt cover 10 is illustrated in FIG. 4.

According to the second embodiment, the seat belt cover 12 is attached to the seat belt 10 by hook and loop pieces 20' and 22'; however, the loop pieces 20b', 22b' thereof are attached, as by sewing or adhesive to the seat belt 12, and t he corresponding hook pieces 20a', 22a' are similarly attached to the underside of the seat belt cover 10. Again, this order could be reversed. The seat belt cover 10 is attached to the seat belt 12 simply by mating the respective hook and loop latch pieces, 20a with 20b and 22a with 22b, as illustrated by arrows 23.

A third embodiment of the seat belt cover 10 is illustrated in FIG. 5. According to the third embodiment, first and second clips 26, 28 are secured to the underside of the seat belt cover 10, as by sewing. The seat belt cover 10 is attached to the seat belt 12 simply by clipping the first and second clips 26, 28 over the seat belt 12, as illustrated by arrows 29.

The seat belt cover 10 is illustrated in FIG. 3 attached to the seat belt 12 with the seat belt 12 in its retracted position. As can be seen from FIG. 3, the seat belt cover 10 neatly folds up as the seat belt 12 retracts, so as not to hinder retraction of the seat belt 12.

It will be understood that my invention can be embodied in other specific forms without departing from the spirit or central characteristics thereof. The present examples and embodiments, therefore, are to be considered in all respects as illustrative and not restrictive, and my invention is not to be limited the specific embodiments disclosed herein.

I claim:

1. A seat belt cover adapted for covering an exposed surface of a seat belt, the seat belt cover comprising:
    an elongated strap having first and second strap ends; and
    means for attaching said strap to said seat belt when said strap covers said exposed surface of said seat belt, said attaching means including:
    a first tab having a first tab secured end attached to said first end of said strap and a first tab free end extending from said first strap end for wrapping around said set belt,
    a second tab having a second tab secured end attached to said second strap end and a second tab free end extending from said second strap end for wrapping around said seat belt,
    a first securing means disposed on said first tab for securing said first tab free end to said first tab secured end when said first tab is wrapped around said seat belt, and
    a second securing means disposed on said second tab for securing said second tab free end to said second tab secured end when said second tab is wrapped around said seat belt.

2. The seat belt cover of claim 1 wherein said elongated strap includes an indicia.

3. The seat belt cover of claim 1 wherein said elongated strap is made of a fire resistant material.

4. The seat belt cover of claim 1 wherein:
    said first securing means comprises a first loop and hook latch device having a first loop piece and a first hook piece, wherein one of said first loop piece and said first hook piece is secured to said first tab free end and an other of said first loop piece and said first hook piece secured to said first strap end, said first loop and hook latch device for securing said first tab free end to said first strap end when said first tab is wrapped around said seat belt; and
    said second securing means comprises a second loop and hook latch device having a second loop piece and a second hook piece, wherein one of said second loop piece and said second hook piece is secured to said second tab free end and an other of said second loop piece and said second hook piece secured to said second strap end, said second loop and hook latch device for securing said second tab free end to said second strap end when said second tab is wrapped around said seat belt.

5. A seat belt cover adapted for attachment to a seat belt comprising:
    an elongated strap having first and second strap ends;
    means for slidably attaching said strap to said seat belt, said attaching means including a first tab having a first tab secured end attached to said first strap end and a first tab free end extending from said first strap end for wrapping around said seat belt, a second tab having a second tab secured end attached to said second strap end and a second tab free end extending from said second strap end for wrapping around said seat belt, a first means disposed on said first tab for securing said first tab free end to said first tab secured end when said first tab is wrapped around said seat belt and a second means disposed on said second tab for securing said second tab free end to said second tab secured end when said second tab is wrapped around said seat belt.

6. The seat belt cover of claim 5 wherein said elongated strap is made of a fire resistant material.

7. A seat belt cover adapted for covering an exposed surface of a seat belt, the seat belt cover comprising:
    an elongated strap having first and second strap ends; and
    means for removability attaching said strap to said seat belt when said strap covers said exposed surface of said seat belt, said attaching means including:
- a first tab having a first tab secured end attached to said first end of said strap and a first tab free end extending from said first strap end for wrapping around said seat belt,
- a second tab having a second tab secured end attached to said second strap end and a second tab free end extending from said second strap end for wrapping around said seat belt,
- a first securing means disposed on said first tab for securing said first tab free end to said first tab secured end when said first tab is wrapped around said seat belt, and
- a second securing means disposed on said second tab for securing said second tab free end to said second tab secured end when said second tab is wrapped around said seat belt.

8. The seat belt cover of claim 7 wherein said elongated strap is made of a fire resistant material.

9. The seat belt cover of claim 7 wherein:
said first securing means comprises a first loop and hook latch device having a first loop piece and a first hook piece, wherein one of said first loop piece and said first hook piece is secured to said first tab free end and an other of said first loop piece and said first hook piece secured to said first strap end, said first loop and hook latch device for securing said first tab free end to said first strap end when said first tab is wrapped around said seat belt; and
said second securing means comprises a second loop and hook latch device having a second loop piece and a second hook piece, wherein one of said second loop piece and said second hook piece is secured to said second tab free end and an other of said second loop piece and said second hook piece secured to said second strap end, said second loop and hook latch device for securing said second tab free end to said second strap end when said second tab is wrapped around said seat belt.

* * * * *